(12) United States Patent
He et al.

(10) Patent No.: US 10,345,433 B2
(45) Date of Patent: *Jul. 9, 2019

(54) DATA ACQUIRING METHOD AND APPARATUS APPLIED TO DRIVERLESS VEHICLE

(71) Applicant: BEIJING BAIDU NETCOM SCIENCE AND TECHNOLOGY CO., LTD., Beijing (CN)

(72) Inventors: Wei He, Beijing (CN); Kaiwen Feng, Beijing (CN); Chengliang Deng, Beijing (CN); Yibing Liang, Beijing (CN); Bocong Liu, Beijing (CN); Zhuo Chen, Beijing (CN); Yu Ma, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 353 days.

This patent is subject to a terminal disclaimer.

(21) Appl. No.: 15/410,906

(22) Filed: Jan. 20, 2017

(65) Prior Publication Data

US 2018/0081039 A1 Mar. 22, 2018

(30) Foreign Application Priority Data

Sep. 20, 2016 (CN) .......................... 2016 1 0834745

(51) Int. Cl.
*G01C 3/08* (2006.01)
*G01S 7/486* (2006.01)
(Continued)

(52) U.S. Cl.
CPC .......... *G01S 7/4861* (2013.01); *G01S 7/4808* (2013.01); *G01S 17/87* (2013.01); *G01S 17/936* (2013.01)

(58) Field of Classification Search
CPC ... H04L 43/04; H04L 43/106; H04L 45/3065; H04L 67/2842; H04L 67/12; H04W 4/44; H04J 3/0661; H04J 3/14; H04Q 9/00
See application file for complete search history.

(56) References Cited

U.S. PATENT DOCUMENTS 9,791,860 B2 * 10/2017 Phillips ................ G05D 1/0033
2014/0169325 A1 * 6/2014 Ratasuk ............ H04W 72/0406
370/330

(Continued)

FOREIGN PATENT DOCUMENTS

CN 104112363 10/2014

*Primary Examiner* — Samantha K Abraham
(74) *Attorney, Agent, or Firm* — Lathrop Gage LLP

(57) ABSTRACT

The present application discloses a data acquiring method and apparatus applied to a driverless vehicle. A specific implementation of the method includes: selecting, from at least one laser radar of the driverless vehicle, a laser radar having a highest importance level as a first laser radar; acquiring a start time of a current time window and executing following data processing steps: executing a real-time acquisition and storage operation on point cloud data packets collected by the each of the at least one laser radar after the start time of the current time window; and determining whether any condition in a group of conditions is satisfied; and setting the start time of the current time window to be the current time and continuing to execute the data processing steps, in response to determining that any of the group of conditions is satisfied. This implementation implements the alignment and storage of point cloud data packets collected by at least one laser radar of the driverless vehicle.

10 Claims, 6 Drawing Sheets

(51) Int. Cl.
*G01S 17/93* (2006.01)
*G01S 17/87* (2006.01)
*G01S 7/48* (2006.01)

(56) References Cited

U.S. PATENT DOCUMENTS

2017/0086054 A1* 3/2017 Azevedo ................ H04W 4/02
2017/0086241 A1* 3/2017 Lopes ................ H04L 12/4641

* cited by examiner

DATA ACQUIRING METHOD AND APPARATUS APPLIED TO DRIVERLESS VEHICLE

CROSS-REFERENCE TO RELATED APPLICATION

This application is related to and claims priority from Chinese application No. 201610834745.7, filed on Sep. 20, 2016, entitled "DATA ACQUIRING METHOD AND APPARATUS APPLIED TO DRIVERLESS VEHICLE", the entire disclosure of which is hereby incorporated by reference.

TECHNICAL FIELD

The present application relates to the field of automotive technologies, specifically to the field of driverless vehicle technologies, and more specifically to a data acquiring method and apparatus applied to a driverless vehicle.

BACKGROUND

A control system of a driverless vehicle relies on sensors to sense the ambient environment. To obtain more abundant and comprehensive information, the driverless vehicle is generally equipped with multiple sensor devices. Among the sensors, a laser radar is responsible for the most important functions such as vehicle locating and obstacle detection. At present, different laser radars are respectively disposed at a plurality of different positions of the driverless vehicle, and the laser radars at different positions cover different viewing angles. To achieve a better control effect, the control system of the driverless vehicle integrates data collected by a plurality of laser radars.

At present, mainly the following two integration methods are used in the industry:

(1) Integration based on preprocessed point cloud data: Respective laser radars scan surrounding objects, after the laser radars rotate a complete cycle, unpacking and compensation processing is performed on all points collected to generate a plurality of point cloud data pieces, and the plurality of point cloud data pieces is then integrated into a new point cloud data piece. Because the laser radars are started at different time points, an offset of up to one cycle in the time domain exists between point cloud data collected by different laser radars, leading to a serious ghosting phenomenon of the integrated point cloud data. As a result, the control system of the driverless vehicle has a serious control error, threatening the safety of the vehicle occupants.

(2) Integration after multiple channels of point cloud data are calculated respectively: The method of calculating multiple channels of point cloud data respectively refers to performing calculation for point cloud data collected by each of the laser radars and then integrating the calculation results, rather than directly integrating point cloud data obtained through scanning by several laser radars. Taking obstacle detection for example, obstacle detection is performed by using scan results of a plurality of laser radars, and then the obstacle detection results are deduplicated. The advantage of this solution is that the channels of data are not directly integrated, thereby avoiding the ghosting problem caused by unsynchronized data. However, because different laser radars have different collection ranges and angles and the data of the different laser radars needs to be integrated in order to obtain comprehensive information, processing the data separately may lead to insufficient information regarding the characteristic value included in point cloud data outputted by some laser radars, thereby greatly reducing the recognition accuracy of the algorithm.

Therefore, the conventional technology of integrating multiple channels of laser radar data has the ghosting problem caused by unsynchronized data, or the problem of low recognition accuracy of the algorithm due to insufficient information regarding the characteristic value.

SUMMARY

An objective of the present application is to provide an improved data acquiring method and apparatus applied to a driverless vehicle, so as to solve the technical problem mentioned in the Background section.

According to a first aspect, the present application provides a data acquiring method applied to a driverless vehicle, the method comprising: acquiring parameter information of each of at least one laser radar of the driverless vehicle, the parameter information comprising: an importance level, a collection period, and a number of point cloud data packets to be collected in a collection period; selecting, from the at least one laser radar, a laser radar having a highest importance level as a first laser radar; acquiring a start time of a current time window and executing following data processing steps: executing a real-time acquisition and storage operation on point cloud data packets collected by the each of the at least one laser radar after the start time of the current time window; and determining whether any condition in a group of conditions is satisfied: a collection period of the first laser radar has elapsed between the start time of the current time window and a current time; and a number of acquired and stored point cloud data packets collected by the first laser radar has reached the number of point cloud data packets to be collected by the first laser radar in a collection period; and setting the start time of the current time window to the current time and continuing to execute the data processing step, in response to determining that any condition in the group of conditions is satisfied.

In some embodiments, the executing the real-time acquisition and storage operation on the point cloud data packets collected by each of the at least one laser radar after the start time of the current time window comprises: acquiring in real time the point cloud data packets collected by each of the at least one laser radar after the start time of the current time window, and storing the point cloud data packets into a cache pointed by a cache address corresponding to the current time window; and after the setting the start time of the current time window to be the current time, the method further comprises: setting a corresponding cache address for the current time window.

In some embodiments, after the selecting, from the at least one laser radar, the laser radar having the highest importance level as the first laser radar, the method further comprises: selecting, from the at least one laser radar, at least one laser radar other than the first laser radar to form a second laser radar set according to the importance level of each of the at least one laser radar; and the group of conditions further comprises: a number of acquired and stored point cloud data packets collected by each laser radar in the second laser radar set has reached a number of point cloud data packets to be collected by the each laser radar in a collection period.

In some embodiments, the selecting, from the at least one laser radar, the at least one laser radar other than the first laser radar to form the second laser radar set according to the importance level of each of the at least one laser radar comprises: sorting the at least one laser radar according to the importance level, and selecting, in descending order of the importance level from the at least one laser radar, a predetermined number of laser radars other than the first laser radar to form the second laser radar set.

In some embodiments, the importance level of the laser radar is preset according to information about a position of the laser radar in the driverless vehicle.

According to a second aspect, the present application provides a data acquiring apparatus applied to a driverless vehicle, the apparatus comprising: an acquiring unit, configured to acquire parameter information of each of at least one laser radar of the driverless vehicle, the parameter information comprising: an importance level, a collection period, and a number of point cloud data packets to be collected in a collection period; a first selection unit, configured to select, from the at least one laser radar, a laser radar having a highest importance level as a first laser radar; a first execution unit, configured to acquire a start time of a current time window and execute following data processing steps: executing a real-time acquisition and storage operation on point cloud data packets collected by the each of the at least one laser radar after the start time of the current time window; and determine whether any condition in a group of conditions is satisfied: a collection period of the first laser radar has elapsed between the start time of the current time window and a current time; and a number of acquired and stored point cloud data packets collected by the first laser radar has reached the number of point cloud data packets to be collected by the first laser radar in a collection period; and a second execution unit, configured to set the start time of the current time window to be the current time and continue to execute the data processing steps, in response to determining that any of the group of conditions is satisfied.

In some embodiments, the first execution unit is further configured to: acquire in real time the point cloud data packets collected by each of the at least one laser radar after the start time of the current time window, and store the point cloud data packets into a cache pointed by a cache address corresponding to the current time window; and the second execution unit is further configured to: set a corresponding cache address for the current time window.

In some embodiments, the apparatus further comprises: a second selection unit, configured to select, from the at least one laser radar, at least one laser radar other than the first laser radar to form a second laser radar set according to the importance level of each of the at least one laser radar; and the group of conditions further comprises: a number of acquired and stored point cloud data packets collected by each laser radar in the second laser radar set has reached a number of point cloud data packets to be collected by the each laser radar in a collection period.

In some embodiments, the second selection unit is further configured to: sort the at least one laser radar according to the importance level, and select, in descending order of the importance level from the at least one laser radar, a predetermined number of laser radars other than the first laser radar to form the second laser radar set.

In some embodiments, the importance level of the laser radar is preset according to information about a position of the laser radar in the driverless vehicle.

According to the data acquiring method and apparatus applied to a driverless vehicle that are provided by the present application, parameter information of each of at least one laser radar of the driverless vehicle is acquired; then, a laser radar having the highest importance level is selected from the at least one laser radar as a first laser radar; next, a start time of a current time window is acquired and the following data processing steps are executed: executing a real-time acquisition and storage operation on point cloud data packets that are collected by the each of the at least one laser radar after the start time of the current time window, and it is determined whether any condition in a group of condition is satisfied: a collection period of the first laser radar has elapsed between the start time of the current time window and a current time; and a number of acquired and stored point cloud data packets that are collected by the first laser radar has reached the number of point cloud data packets that should be collected by the first laser radar in a collection period; finally, the start time of the current time window is set to be the current time and the above-mentioned data processing steps continue to be executed, in response to determining that any of the above-mentioned group of conditions is satisfied. Thereby, the alignment and storage of point cloud data packets collected by the at least one laser radar of the driverless vehicle are implemented.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
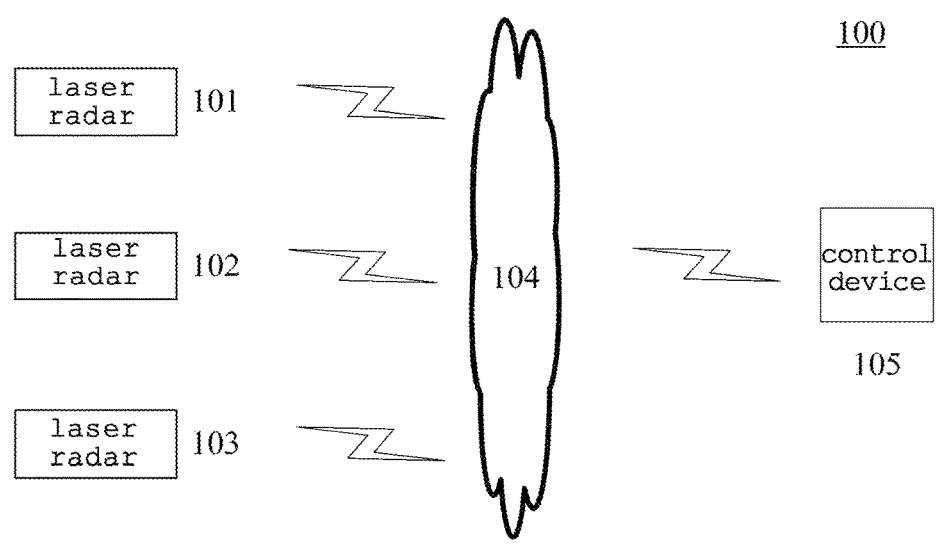
FIG. 1 is an architecture diagram of an exemplary system in which the present application can be implemented.

FIG. 1 shows an exemplary system architecture 100 in which a data acquiring method applied to a driverless vehicle or a data acquiring apparatus applied to the driverless vehicle according to an embodiment of the present application can be implemented.

As shown in FIG. 1, the system architecture 100 may include laser radars 101, 102, and 103, a network 104, and a control device 105. The network 104 is a medium for providing communication links between the laser radars 101, 102, and 103 and the control device 105. The network 104 may include various connection types, such as wired and wireless communication links, buses, network cables, or optical fiber cables.

The laser radars 101, 102, and 103 may interact with the control device 105 through the network 104 to receive or transmit a message or the like. For example, the control device 105 may send a control instruction to the laser radars 101, 102, and 103 through the network 104, and the laser radars 101, 102, and 103 may transmit point cloud data packets collected thereby to the control device 105 through the network 104. Various applications, for example, a laser radar data acquiring application, a laser radar data processing application, and the driverless vehicle control application, may be installed on the control device 105.

It should be noted that the data acquiring method applied to the driverless vehicle that is provided in the embodiments of the present application is generally executed by the control device 105. Correspondingly, the data acquiring apparatus applied to the driverless vehicle is generally disposed in the control device 105.

It should be appreciated that the number of laser radars, the number of networks, and the number of control devices in FIG. 1 are merely exemplary. Any number of laser radars, networks, and control devices may be set according to implementation requirements.

Figure 2:
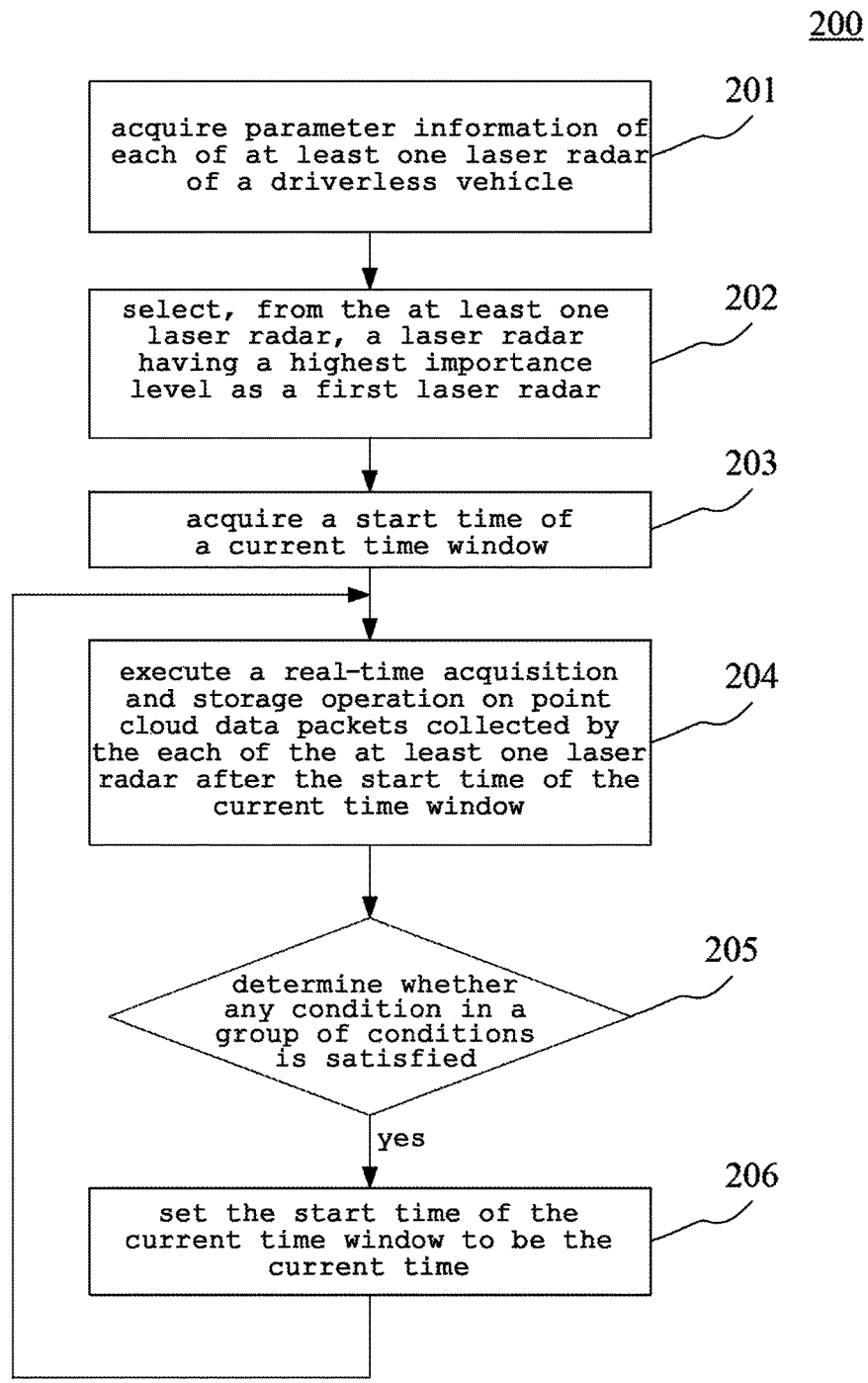
FIG. 2 is a flow chart of a data acquiring method applied to a driverless vehicle according to an embodiment of the present application.

Further, referring to FIG. 2, FIG. 2 shows a flow 200 of a data acquiring method applied to a driverless vehicle according to an embodiment of the present application. The data acquiring method applied to a driverless vehicle includes the following steps:

Step 201. Acquire parameter information of each of at least one laser radar of the driverless vehicle.

In this embodiment, the parameter information of each of the at least one laser radar of the driverless vehicle may be locally stored in an electronic device (for example, the control device shown in FIG. 1) on which the data acquiring method applied to the driverless vehicle is run, so that the above-mentioned electronic device can locally acquire the parameter information of each of the at least one laser radar that is set in the driverless vehicle where the electronic device is located. Alternatively, the parameter information of each of the at least one laser radar of the driverless vehicle may be stored in a cloud server (not shown) that provides support for the above-mentioned driverless vehicle, so that the above-mentioned electronic device can acquire the parameter information of each of the at least one laser radar of the driverless vehicle remotely from the above-mentioned cloud server.

In this embodiment, the parameter information of the laser radar may include: an importance level, a collection period, and a number of point cloud data packets that should be collected in a collection period.

In this embodiment, an importance level may be preset for each laser radar of the driverless vehicle. The importance level represents the importance of the function of the laser radar in the control system of the driverless vehicle. The importance level may be expressed in various manners. As an example, the importance level may be expressed using a numeral. For example, there are five importance levels: "1", "2", "3", "4", and "5", the level "1" being the lowest, and the level "5" being the highest. Alternatively, the importance level may be expressed using a character. For example, there are five importance levels: "A", "B", "C", "D", and "E", the level "A" being the lowest, and the level "E" being the highest. Alternatively, the importance level may be expressed using text. For example, there are five importance levels: "the most important", "very important", "important", "normal", "not important", the level "most important" being the highest, and the level "not important" being the lowest.

In some optional implementations of this embodiment, the importance level of the laser radar may be preset according to information about a position of the laser radar in the driverless vehicle. For example, a laser radar at the top of the driverless vehicle has a large scan range, and accordingly, the highest importance level may be set for the laser radar.

In this embodiment, a collection period may be preset for each laser radar of the driverless vehicle. The collection period indicates a time required for the laser radar to collect data once. The collection period of the laser radar may be preset according to a hardware parameter of the laser radar. For example, if it takes 100 ms for the laser radar to rotate one cycle, the collection period of the laser radar is 100 ms.

In this embodiment, the number of point cloud data packets that should be collected in a collection period may be preset for each laser radar of the driverless vehicle. The number of point cloud data packets that should be collected in a collection period is the number of point cloud data packets that can be normally collected by the laser radar in each collection period. The number of point cloud data packets that should be collected by the laser radar in a collection period may be preset according to a hardware parameter of the laser radar. For example, for a 64-line laser radar, each line of laser radar normally can collect 6 point cloud data packets in each collection period, and the 64-line laser radar normally should collect 64*6=384 point cloud data packets in a collection period. Therefore, the number of point cloud data packets that should be collected by the 64-line laser radar in a collection period is 384.

Step 202. Select, from the at least one laser radar, a laser radar having a highest importance level as a first laser radar.

In this embodiment, after acquiring the parameter information of each laser radar of the driverless vehicle, the above-mentioned electronic device may select, from the at least one laser radar, a laser radar having the highest importance level as the first laser radar.

Step 203. Acquire a start time of a current time window.

In this embodiment, a time window includes a start time and an end time, and the difference between the end time and the start time of the time window is the length of the time window. Herein, the acquiring the start time of the current time window may refer to acquiring the current time as the start time of the current time window when the driverless vehicle switches from a stopped state or an engine off state to a driving state. After acquiring the start time of the current time window, the above-mentioned electronic device may perform step 204 to acquire in real time and store point cloud data packets that are collected by the each of the at least one laser radar of the driverless vehicle after the start time of the current time window. In the process of executing a real-time acquisition and storage operation on point cloud data packets collected by the each of the at least one laser radar in step 204, there is only one current time window at a same time. When the current time window begins, step 204 is performed to execute the real-time acquisition and storage operation, and it is determined in step 205 whether a condition of ending the current time window is satisfied. If yes, step 206 is performed to end the current time window and enter a next time window, the start time of the next time window being the end time of the previous time window. Step 204 is re-executed by using the next time window as the current time window.

In some optional implementations of this embodiment, the above-mentioned electronic device may acquire a current time provided by an operating system thereof as the start time of the current time window.

In some optional implementations of this embodiment, the above-mentioned electronic device may alternatively acquire, remotely from a cloud server providing a time service, a current time provided by the above-mentioned cloud server as the start time of the current time window.

In some optional implementations of this embodiment, the above-mentioned electronic device may alternatively acquire, from a Global Positioning System (GPS) installed on the driverless vehicle, a current time provided by the GPS as the start time of the current time window.

Step 204. Execute a real-time acquisition and storage operation on point cloud data packets that are collected by the each of the at least one laser radar after the start time of the current time window.

In this embodiment, the above-mentioned electronic device may execute a real-time acquisition and storage operation on point cloud data packets that are collected by each of the at least one laser radar after the start time of the current time window.

In some optional implementations of this embodiment, the above-mentioned electronic device may acquire in real time the point cloud data packets that are collected by each of the at least one laser radar after the start time of the current time window, and store the point cloud data packets into a cache pointed by a cache address corresponding to the current time window. Herein, the cache address corresponding to the current time window may be a corresponding cache address that is set for the current time window after the start time of the current time window is set to be the current time in step 206 and before step 204 is performed. Based on the above-mentioned operation, point cloud data packets collected by the at least one laser radar in one time window are stored into a cache pointed by one cache address, and point cloud data packets collected by the at least one laser radar in different time windows are stored into caches pointed by cache addresses corresponding to the different time windows, thereby implementing the alignment and storage of point cloud data packets collected by the at least one laser radar.

Step 205. Determine whether any condition in a group of conditions is satisfied; if yes, perform step 206.

In this embodiment, in the process of executing the real-time acquisition and storage operation on the point cloud data packets that are collected by each of the at least one laser radar after the start time of the current time window, the above-mentioned electronic device may determine in real time whether any condition in a group of conditions is satisfied. If yes, step 206 may be performed. Herein, the group of condition may include: the collection period of the first laser radar has elapsed between the start time of the current time window and a current time, and the number of acquired and stored point cloud data packets that are collected by the first laser radar has reached the number of point cloud data packets that should be collected by the first laser radar in a collection period.

In some optional implementations of this embodiment, after step 202, the above-mentioned electronic device may further select, from the at least one laser radar according to importance levels of laser radars, at least one laser radar other than the first laser radar to form a second laser radar set; and the above-mentioned group of conditions may further include: the number of acquired and stored point cloud data packets that are collected by each laser radar in the second laser radar set has reached the number of point cloud data packets that should be collected by the laser radar in a collection period.

In some optional implementations of this embodiment, the above-mentioned electronic device may sort the at least one laser radar according to the importance level first, and then may select, in descending order of the importance level from the at least one laser radar, a predetermined number of laser radars other than the first laser radar to form the second laser radar set.

In some optional implementations of this embodiment, the above-mentioned electronic device may alternatively select, from the at least one laser radar, all laser radars having an importance level that is one level lower than the importance level of the first laser radar to form the second laser radar set.

In some optional implementations of this embodiment, the above-mentioned electronic device may alternatively select, from the at least one laser radar, a first predetermined number of laser radars having an importance level that is one level lower than the importance level of the first laser radar to form the second laser radar set.

Step 206. Set the start time of the current time window to the current time, and perform step 204.

In this embodiment, if determining that any condition in the group of conditions is satisfied, the above-mentioned electronic device may set the start time of the current time window to the current time (that is, enter a next time window) and perform step 204.

In some optional implementations of this embodiment, after setting the start time of the current time window to the current time and before performing step 204, the above-mentioned electronic device may further set a corresponding cache address for the current time window. That is, the previous time window already ends, the cache address of the current time window is different from the cache address of the previous time window, and a new cache address needs to be set for the current time window, so that after the current time window begins, it can be determined to store the point cloud data packets collected by each of the at least one laser radar after the start time of the current time window into a cache pointed by the cache address corresponding to the current time window.

It should be noted that when the driverless vehicle is in the driving state, the above-mentioned data processing step from step 204 to step 206 is continuously performed, for the purpose of providing information to the control system of the driverless vehicle by using the point cloud data packets collected by the at least one laser radar, so that the control system of the driverless vehicle generates a control instruction to control driving of the vehicle. If the driverless vehicle is in the stopped state or the engine off state, the above-mentioned data processing step from step 204 to step 206 may be stopped. When the driverless vehicle enters the driving state again, the flow may be re-executed starting from step 201.

In some optional implementations of this embodiment, a robot operating system (ROS) may be installed on the control device of the above-mentioned driverless vehicle. The robot operating system may be formed by a large number of nodes and topics. Each node may be an independent process. There may be two types of nodes: sending nodes and receiving nodes. The sending node may be used for sending data that is collected, and the receiving node may be used for receiving data that is sent from the sending node (sometime, a node may serve as both a sending node and a receiving node). A topic is a basis for establishing a connection between the nodes. After a connected is established between the nodes, the sending node and the receiving node may perform data transmission by means of a shared memory. In addition, data of different topics may be transmitted by using different shared memories. According to the above-mentioned data acquiring method applied to a driverless vehicle, the above-mentioned data acquiring method applied to a driverless vehicle may be executed by a sending node in the robot operating system. The sending node may align point cloud data packets collected by the at least one laser radar on the driverless vehicle and then store the point cloud data packets into a shared memory that serves as a transmission medium between the sending node and the receiving node. When the current time window of the sending node ends, the sending node may send, to the receiving node, a message indicating that the point cloud data packets collected by the at least one laser radar have been aligned and stored, so that the receiving node can acquire, from the shared memory that serves as a transmission medium between the sending node and the receiving node, the aligned and stored point cloud data packets collected by the at least one laser radar. The receiving node may perform corresponding processing on the acquired point cloud data packets to generate a control instruction for controlling the driverless vehicle. That is, the sending node and the receiving node jointly implement the integration of external environment data collected by the at least one laser radar and the conversion of the data into a control instruction, thereby controlling the driverless vehicle.

Figure 3A:
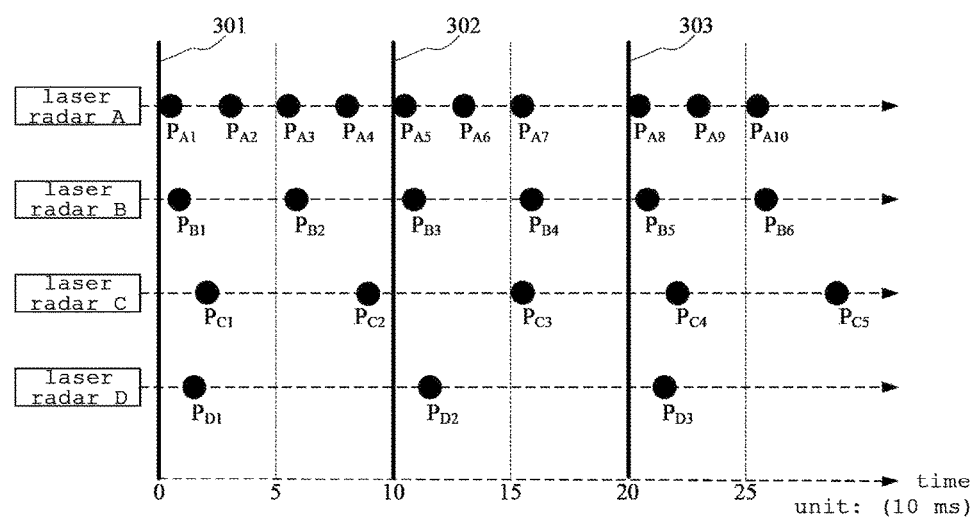
FIG. 3a and FIG. 3b are schematic diagrams of an application scenario of a data acquiring method applied to a driverless vehicle according to the present application.
Figure 3B:
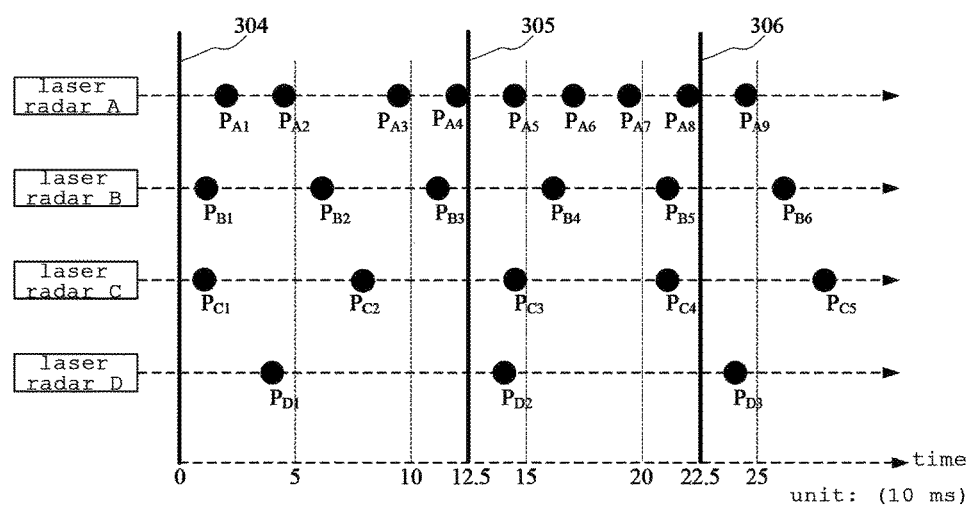

Further, referring to FIG. 3a and FIG. 3b, FIG. 3a and FIG. 3b are schematic diagrams of an application scenario of the data acquiring method applied to a driverless vehicle according to this embodiment. In the application scenario of FIG. 3a and FIG. 3b, there are four laser radars, namely, a laser radar A, a laser radar B, a laser radar C, and a laser radar D. Parameter information of the four laser radars are as shown in Table 1.

TABLE 1

| Name of laser radar | Importance level | Collection period | Number of point cloud data packets that should be collected in a collection period |
|---|---|---|---|
| laser radar A | 5 | 100 ms | 4 |
| laser radar B | 4 | 200 ms | 4 |
| laser radar C | 4 | 200 ms | 3 |
| laser radar D | 1 | 100 ms | 1 |

It may be determined from Table 1 that the laser radar A has the highest importance level, and therefore the laser radar A is used as the first laser radar.

In FIG. 3a and FIG. 3b, the horizontal axis represents time, the longitudinal axis represents different laser radars, and black dots represent data packets collected by different laser radars at corresponding time points, wherein $P_{A1}$ represents the first data packet collected by the laser radar A, $P_{A2}$ represents the second data packet collected by the laser radar A, . . . , and $P_{A10}$ represents the tenth data packet collected by the laser radar A; $P_{B1}$ represents the first data packet collected by the laser radar B, $P_{B2}$ represents the second data packet collected by the laser radar B, . . . , and $P_{B6}$ represents the sixth data packet collected by the laser radar B; $P_{C1}$ represents the first data packet collected by the laser radar C, $P_{C2}$ represents the second data packet collected by the laser radar C, . . . , and $P_{C5}$ represents the fifth data packet collected by the laser radar C; and $P_{D1}$ represents the first data packet collected by the laser radar D, $P_{D2}$ represents the second data packet collected by the laser radar D, and $P_{D3}$ represents the third data packet collected by the laser radar D.

FIG. 3a is a schematic diagram of a data processing step performed when a condition "the collection period of the first laser radar has elapsed between the start time of the current time window and the current time" in the group of conditions is satisfied. In FIG. 3a, the collection period of the first laser radar (that is, the laser radar A) is 100 ms. Therefore, regardless of the number of data packets collected by each laser radar, the current time will be used as the start time of the current time window so as to end the previous time window and enter a next time window, as long as the collection period (that is, 100 ms) of the first laser radar has elapsed between the start time of the current time window and the current time. As shown in FIG. 3a, the start time of the first time window is 0 ms (the time point indicated by the straight line denoted by the reference sign 301 as shown in FIG. 3a), and the end time of the first time window is the start time plus the collection period (that is, 100 ms) of the first laser radar, that is, 100 ms (the time point indicated by the straight line denoted by the reference sign 302 as shown in FIG. 3a). From the start time 0 ms of the first time window to the end time 100 ms of the first time window, the control device has acquired in real time and stored four data packets $P_{A1}$, $P_{A2}$, $P_{A3}$, and $P_{A4}$ collected by the laser radar A, two data packets $P_{B1}$ and $P_{B2}$ collected by the laser radar B, two data packets $P_{C1}$ and $P_{C2}$ collected by the laser radar C, and one data packet $P_{D1}$ collected by the laser radar D. In this case, the condition "the collection period of the first laser radar has elapsed between the start time of the current time window and the current time" in the group of conditions is already satisfied. Therefore, the control device sets the start time of the current window to the current time 100 ms (the time point indicated by the straight line denoted by the reference sign 302 as shown in FIG. 3a), so as to enter the second time window, the start time of the second time window being 100 ms, and the end time of the second time window being the start time plus the collection period (that is, 100 ms) of the first laser radar, that is, 200 ms (the time point indicated by the straight line denoted by the reference sign 303 as shown in FIG. 3a). From the start time 100 ms of the second time window to the end time 200 ms of the second time window, the control device has acquired in real time and stored three data packets $P_{A5}$, $P_{A6}$, and $P_{A7}$ collected by the laser radar A, two data packets $P_{B3}$ and $P_{B4}$ collected by the laser radar B, one data packet $P_{C3}$ collected by the laser radar C, and one data packet $P_{D2}$ collected by the laser radar D. In this case, the condition "the collection period of the first laser radar has elapsed between the start time of the current time window and the current time" in the group of conditions is already satisfied. Therefore, the control device sets the start time of the current window to the current time 200 ms, so as to enter the third time window, the start time of the third time window being 200 ms (the time point indicated by the straight line denoted by the reference sign 303 as shown in FIG. 3a), and the end time of the third time window being the start time plus the collection period (that is, 100 ms) of the first laser radar, that is, 300 ms. The rest can be deduced by analogy. Through the above-mentioned data processing step, the control device implements the alignment and storage of point cloud data packets collected by at least one laser radar.

FIG. 3b is a schematic diagram of a data processing step performed when a condition "the number of acquired and stored point cloud data packets that are collected by the first laser radar has reached the number of point cloud data packets that should be collected by the first laser radar in a collection period" in the group of conditions is satisfied. As can be seen from Table 1, the number of point cloud data packets that should be collected by the first laser radar (that is, the laser radar A) in a collection period is 4. Therefore, regardless of the time that has elapsed, a next time window will be entered only when the number of acquired and stored point cloud data packets that are collected by the laser radar A after the start time of the current time window reaches 4. As shown in FIG. 3b, the start time of the first time window is 0 ms (the time point indicated by the straight line denoted by the reference sign 304 as shown in FIG. 3b), and when the number of acquired and stored data packets that are collected by the laser radar A after the start time of the first time window reaches 4 (the time point 125 ms indicated by the straight line denoted by the reference sign 305 as shown in FIG. 3b), the first time window ends, and the second time window is entered. From the start time (the time point 0 ms indicated by the straight line denoted by the reference sign 304 as shown in FIG. 3b) of the first time window to the end time (the time point 125 ms indicated by the straight line denoted by the reference sign 305 as shown in FIG. 3b) of the first time window, the control device has acquired in real time and stored four data packets $P_{A1}$, $P_{A2}$, $P_{A3}$, and $P_{A4}$ collected by the laser radar A, three data packets $P_{B1}$, $P_{B2}$, and $P_{B3}$ collected by the laser radar B, two data packets $P_{C1}$ and $P_{C2}$ collected by the laser radar C, and one data packet $P_{D1}$ collected by the laser radar D. In this case, the condition "the number of acquired and stored point cloud data packets that are collected by the first laser radar has reached the number of point cloud data packets that should be collected by the first laser radar in a collection period" in the group of conditions is already satisfied. Therefore, the control device sets the start time of the current window to the current time 125 ms, so as to enter the second time window, the start time of the second time window being the end time 125 ms (the time point indicated by the straight line denoted by the reference sign 305 as shown in FIG. 3b) of the first time window. When the number of acquired and stored data packets that are collected by the laser radar A after the start time of the second time window reaches 4 (the time point 225 ms indicated by the straight line denoted by the reference sign 306 as shown in FIG. 3b), the third time window is entered. From the start time (that is, 125 ms) of the second time window to the end time (that is, 225 ms) of the second time window, the control device has acquired in real time and stored four data packets $P_{A5}$, $P_{A6}$, $P_{A7}$, and $P_{A8}$ collected by the laser radar A, two data packets $P_{B4}$ and $P_{B5}$ collected by the laser radar B, two data packets $P_{C3}$ and $P_{C4}$ collected by the laser radar C, and one data packet $P_{D2}$ collected by the laser radar D. In this case, the condition "the number of acquired and stored point cloud data packets that are collected by the first laser radar has reached the number of point cloud data packets that should be collected by the first laser radar in a collection period" in the group of conditions is already satisfied. Therefore, the control device sets the start time of the current window to the current time 225 ms (the time point 225 ms indicated by the straight line denoted by the reference sign 306 as shown in FIG. 3b), so as to enter the third time window, the start time of the third time window being the end time 225 ms of the second time window. The rest can be deduced by analogy. Through the above-mentioned data processing step, the control device implements the alignment and storage of point cloud data packets collected by at least one laser radar.

The method provided in the above-mentioned embodiment of the present application, by determining a first laser radar in at least one laser radar of a driverless vehicle; then acquiring a start time of a current time window and executing the following data processing steps: executing a real-time acquisition and storage operation on data packets that are collected by each of the at least one laser radar after the start time of the current time window; determining whether any condition in a group of conditions is satisfied; and setting the start time of the current time window to be the current time and continuing to execute the above-mentioned data processing step after determining that any condition in the group of conditions is satisfied, implements the alignment and storage of point cloud data packets collected by at least one laser radar of a driverless vehicle.

Figure 4:
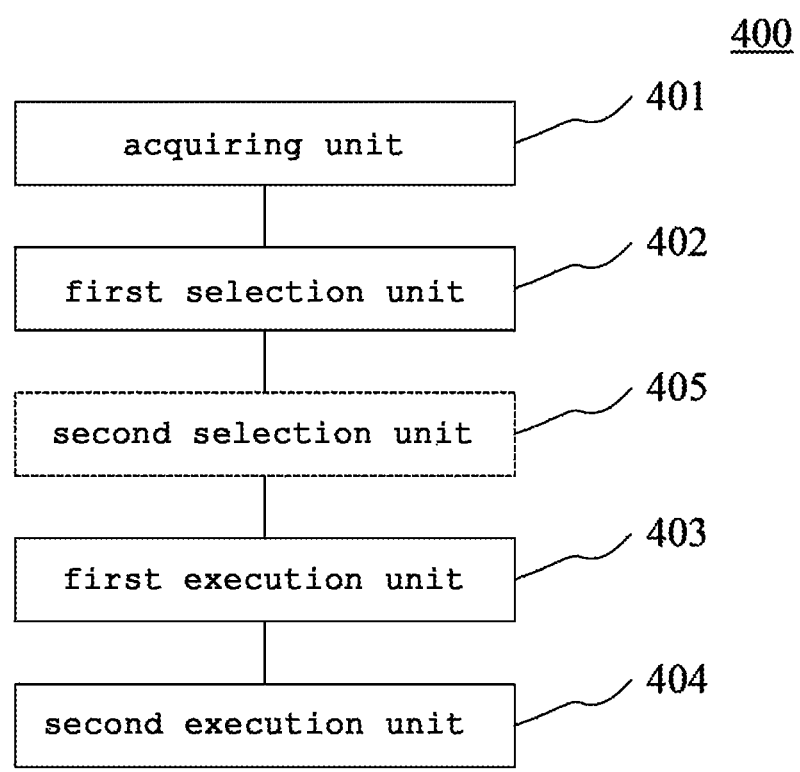
FIG. 4 is a schematic structural diagram of a data acquiring apparatus applied to a driverless vehicle according to an embodiment of the present application.

Further, referring to FIG. 4, as an implementation of the methods shown in the above-mentioned figures, the present application provides an embodiment of a data acquiring apparatus applied to a driverless vehicle. This apparatus embodiment corresponds to the method embodiment shown in FIG. 2. The apparatus may be specifically applied to various electronic devices.

As shown in FIG. 4, the data acquiring apparatus 400 applied to a driverless vehicle of this embodiment includes: an acquiring unit 401, a first selection unit 402, a first execution unit 403, and a second execution unit 404. The acquiring unit 401 is configured to acquire parameter information of each of at least one laser radar of the driverless vehicle, the above-mentioned parameter information including: an importance level, a collection period, and the number of point cloud data packets that should be collected in a collection period. The first selection unit 402 is configured to select, from the above-mentioned at least one laser radar, a laser radar having a highest importance level as a first laser radar. The first execution unit 403 is configured to acquire a start time of a current time window and execute the following data processing steps: executing a real-time acquisition and storage operation on point cloud data packets that are collected by the each of the above-mentioned at least one laser radar after the start time of the above-mentioned current time window; and determine whether any condition in the following group of conditions is satisfied: a collection period of the above-mentioned first laser radar has elapsed between the start time of the above-mentioned current time window and a current time, and a number of acquired and stored point cloud data packets that are collected by the above-mentioned first laser radar has reached the number of point cloud data packets that should be collected by the above-mentioned first laser radar in a collection period. The second execution unit 404 is configured to set the start time of the above-mentioned current time window to the current time and continue to execute the above-mentioned data processing step, in response to determining that any condition in the above-mentioned group of conditions is satisfied.

In this embodiment, specific implementations of the acquiring unit 401, the first selection unit 402, the first execution unit 403, and the second execution unit 404 in the data acquiring apparatus 400 applied to the driverless vehicle and the technical effects achieved thereby can be referred to the related descriptions of step 201, step 202, step 203 to step 205, and step 206 in the embodiment corresponding to FIG. 2 respectively, and will not be repeatedly described here.

In some optional implementations of this embodiment, the above-mentioned first execution unit 403 may be further configured to: acquire in real time point cloud data packets that are collected by each of the above-mentioned at least one laser radar after the start time of the above-mentioned current time window, and store the point cloud data packets into a cache pointed by a cache address corresponding to the above-mentioned current time window; and the above-mentioned second execution unit 404 may be further configured to: set a corresponding cache address for above-mentioned current time window.

In some optional implementations of this embodiment, the above-mentioned data acquiring apparatus 400 applied to a driverless vehicle may further include: a second selection unit 405, configured to select, from above-mentioned at least one laser radar, at least one laser radar other than the above-mentioned first laser radar to form a second laser radar set according to the importance level of each of the at least one laser radar; and the above-mentioned group of conditions may further include: the number of acquired and stored point cloud data packets that are collected by each laser radar in the above-mentioned second laser radar set has reached the number of point cloud data packets that should be collected by the laser radar in a collection period.

In some optional implementations of this embodiment, the above-mentioned second selection unit 405 may be further configured to: sort the above-mentioned at least one laser radar according to the importance level, and select, in descending order of the importance level from the above-mentioned at least one laser radar, a predetermined number of laser radars other than the above-mentioned first laser radar to form the second laser radar set.

In some optional implementations of this embodiment, the importance level of the above-mentioned laser radar may be preset according to information about a position of the laser radar in the above-mentioned driverless vehicle.

Figure 5:
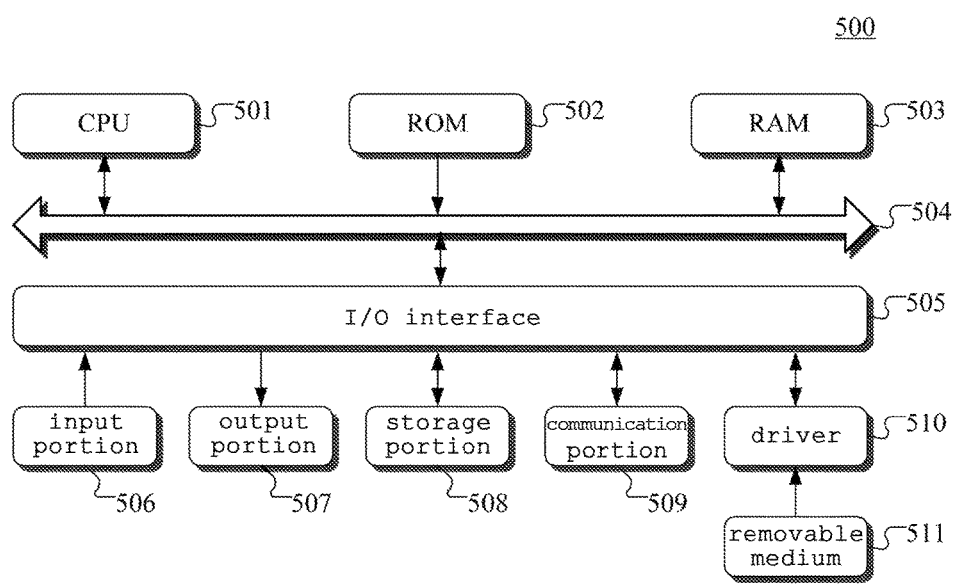
FIG. 5 is a schematic structural diagram of a computer system adapted to implement a control device according to an embodiment of the present application.

Referring to FIG. 5, a schematic structural diagram of a computer system 500 adapted to implement a control device the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a sensor, an Electronic Control Unit (ECU) etc.; an output portion 507 comprising a sensor, an Electronic Control Unit (ECU) etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flowchart may be implemented in a computer software program. For example, an embodiment of the present disclosure includes a computer program product, which comprises a computer program that is tangibly embedded in a machine-readable medium. The computer program comprises program codes for executing the method of the flowchart. In such an embodiment, the computer program may be downloaded and installed from a network via the communication portion 509, and/or may be installed from the removable media 511. When the computer program is executed by the CPU 501, the above functions described in the method of the present application may be implemented.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising an obtaining unit, a selecting unit, a first performing unit and a second performing unit, where the names of these units are not considered as a limitation to the units. For example, the obtaining unit may also be described as "a unit for obtaining parameter information".

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The programs are used by one or more apparatus to execute the steps: acquiring parameter information of each of at least one laser radar of the driverless vehicle, the parameter information comprising: an importance level, a collection period, and a number of point cloud data packets to be collected in a collection period; selecting, from the at least one laser radar, a laser radar having a highest importance level as a first laser radar; acquiring a start time of a current time window and executing following data processing steps: executing a real-time acquisition and storage operation on point cloud data packets collected by the each of the at least one laser radar after the start time of the current time window; and determining whether any condition in a group of conditions is satisfied: a collection period of the first laser radar has elapsed between the start time of the current time window and a current time; and a number of acquired and stored point cloud data packets collected by the first laser radar has reached the number of point cloud data packets to be collected by the first laser radar in a collection period; and setting the start time of the current time window to be the current time and continuing to execute the data processing steps, in response to determining that any of the group of conditions is satisfied.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data acquiring method applied to a driverless vehicle, the method comprising:
    acquiring parameter information of each of at least one laser radar of the driverless vehicle, the parameter information comprising: an importance level, a collection period, and a number of point cloud data packets to be collected in a collection period;
    selecting, from the at least one laser radar, a laser radar having a highest importance level as a first laser radar;
    acquiring a start time of a current time window and executing following data processing steps:
        executing a real-time acquisition and storage operation on point cloud data packets collected by the each of the at least one laser radar after the start time of the current time window; and
        determining whether any condition in a group of conditions is satisfied: a collection period of the first laser radar has elapsed between the start time of the current time window and a current time; and a number of acquired and stored point cloud data packets collected by the first laser radar has reached the number of point cloud data packets to be collected by the first laser radar in a collection period; and
    setting the start time of the current time window to be the current time and continuing to execute the data processing steps, in response to determining that any of the group of conditions is satisfied.

2. The method according to claim 1, wherein the executing the real-time acquisition and storage operation on the point cloud data packets collected by each of the at least one laser radar after the start time of the current time window comprises:
    acquiring in real time the point cloud data packets collected by each of the at least one laser radar after the start time of the current time window, and storing the point cloud data packets into a cache pointed by a cache address corresponding to the current time window; and
    after the setting the start time of the current time window to be the current time, the method further comprises:
    setting a corresponding cache address for the current time window.

3. The method according to claim 1, wherein after the selecting, from the at least one laser radar, the laser radar having the highest importance level as the first laser radar, the method further comprises:
    selecting, from the at least one laser radar, at least one laser radar other than the first laser radar to form a second laser radar set according to the importance level of each of the at least one laser radar; and
    the group of conditions further comprises: a number of acquired and stored point cloud data packets collected by each laser radar in the second laser radar set has reached a number of point cloud data packets to be collected by the each laser radar in a collection period.

4. The method according to claim 3, wherein the selecting, from the at least one laser radar, the at least one laser radar other than the first laser radar to form the second laser radar set according to the importance level of each of the at least one laser radar comprises:
    sorting the at least one laser radar according to the importance level, and selecting, in descending order of the importance level from the at least one laser radar, a predetermined number of laser radars other than the first laser radar to form the second laser radar set.

5. The method according to claim 1, wherein the importance level of the laser radar is preset according to information about a position of the laser radar in the driverless vehicle.

6. A data acquiring apparatus applied to a driverless vehicle, the apparatus comprising:
    at least one processor; and
    a memory storing instructions, which when executed by the at least one processor, cause the at least one processor to perform operations, the operations comprising:
    acquiring parameter information of each of at least one laser radar of the driverless vehicle, the parameter information comprising: an importance level, a collection period, and a number of point cloud data packets to be collected in a collection period;
    selecting, from the at least one laser radar, a laser radar having a highest importance level as a first laser radar;
    acquiring a start time of a current time window and execute following data processing steps:
        executing a real-time acquisition and storage operation on point cloud data packets collected by the each of the at least one laser radar after the start time of the current time window; and
        determine whether any condition in a group of conditions is satisfied: a collection period of the first laser radar has elapsed between the start time of the current time window and a current time; and a number of acquired and stored point cloud data packets collected by the first laser radar has reached the number of point cloud data packets to be collected by the first laser radar in a collection period; and
    setting the start time of the current time window to be the current time and continuing to execute the data processing steps, in response to determining that any of the group of the conditions is satisfied.

7. The apparatus according to claim 6, wherein the executing the real-time acquisition and storage operation on the point cloud data packets collected by each of the at least one laser radar after the start time of the current time window comprises:
    acquiring in real time the point cloud data packets collected by each of the at least one laser radar after the start time of the current time window, and storing the point cloud data packets into a cache pointed by a cache address corresponding to the current time window; and
    after the setting the start time of the current time window to be the current time, the operations further comprises:
    setting a corresponding cache address for the current time window.

8. The apparatus according to claim 6, wherein the operations further comprises:
    selecting, from the at least one laser radar, at least one laser radar other than the first laser radar to form a second laser radar set according to the importance level of each of the at least one laser radar; and the group of conditions further comprises: a number of acquired and stored point cloud data packets collected by each laser radar in the second laser radar set has reached a number of point cloud data packets to be collected by the each laser radar in a collection period.

9. The apparatus according to claim 8, wherein the selecting, from the at least one laser radar, the at least one laser radar other than the first laser radar to form the second laser radar set according to the importance level of each of the at least one laser radar comprises:

sorting the at least one laser radar according to the importance level, and selecting, in descending order of the importance level from the at least one laser radar, a predetermined number of laser radars other than the first laser radar to form the second laser radar set.

10. The apparatus according to claim 6, wherein the importance level of the laser radar is preset according to information about a position of the laser radar in the driverless vehicle.

\* \* \* \* \*